United States Patent [19]

Lane, Jr.

[11] Patent Number: 4,566,573
[45] Date of Patent: Jan. 28, 1986

[54] PRESSURE PLATE STRAP DRIVE APPARATUS AND METHOD

[75] Inventor: Wendell C. Lane, Jr., Laurinburg, N.C.

[73] Assignee: Dana Corporation, Toledo, Ohio

[21] Appl. No.: 449,961

[22] Filed: Dec. 15, 1982

[51] Int. Cl.$^4$ ............... F16D 13/44; F16D 13/69; F16D 13/70

[52] U.S. Cl. ............... 192/70.18; 29/464; 29/467; 192/70.28

[58] Field of Search ............... 192/70.18, 70.13, 70.28, 192/109 R; 29/464, 467, 469

[56] References Cited

U.S. PATENT DOCUMENTS

| | | | |
|---|---|---|---|
| Re. 21,937 | 11/1941 | Wemp | 192/70.18 |
| 1,962,797 | 6/1934 | Wemp | 192/70.18 |
| 2,211,192 | 8/1940 | Wolfram | 192/70.18 |
| 2,253,344 | 8/1941 | Nutt et al. | 192/70.18 |
| 2,277,221 | 3/1942 | Gamble | 192/70.27 |
| 2,277,557 | 3/1942 | Nutt | 192/70.12 |
| 2,311,997 | 2/1943 | Pearson | 192/89 B |
| 2,858,681 | 11/1958 | Smirl et al. | |
| 3,061,062 | 10/1962 | Smirl | 192/70.18 |
| 3,086,634 | 4/1963 | Reed | 192/111 A |
| 3,360,089 | 12/1967 | Cockerill et al. | 192/111 A |
| 3,450,241 | 6/1969 | Kuno | 192/70.18 |
| 3,554,342 | 1/1971 | Spokas | 192/70.18 |
| 3,758,094 | 9/1973 | Crutchley et al. | 267/162 |
| 3,939,951 | 2/1976 | Sink et al. | 192/89 B |
| 3,981,381 | 9/1976 | Nosek | 192/70.13 X |
| 4,057,131 | 11/1977 | Flotow | 192/70.13 |
| 4,122,929 | 10/1978 | Maucher et al. | 192/70.18 |

Primary Examiner—Rodney H. Bonck
Attorney, Agent, or Firm—Frank B. McDonald

[57] ABSTRACT

A strap drive 50 is employed for connecting a pressure plate 20 to a cover assembly 31 in a clutch 10. The strap drive provides a fixed concentricity of the pressure plate relative to the cover assembly during assembly of the clutch, and provides a method whereby misalignments due to weights and clearances of mating clutch parts may be avoided. A preferred method of insuring proper alignment of a clutch pressure plate includes the steps of forming a subassembly 80 to prealign the pressure plate with respect to an adaptor ring 32, and fixing the subassembly to a flywheel 12 as an intermediate assembly procedure. The result is an avoidance of misalignments normally introduced during assembly, and which produce undesirable vibrations during operation of the clutch.

6 Claims, 5 Drawing Figures

PRESSURE PLATE STRAP DRIVE APPARATUS AND METHOD

BACKGROUND OF THE INVENTION

This invention relates to the alignment of pressure plates in clutches. More particularly, the invention relates to strap drive devices and methods of installation thereof, as related to assuring concentricity of a clutch pressure plate relative to associated flywheel and clutch cover members during assembly.

Many techniques of clutch assembly have been employed for securing alignment of a pressure plate relative to a clutch cover and flywheel during clutch assembly. A typical and perhaps most common procedure involves the use of guide pins for alignment of clutch parts during assembly. The weight of the parts, and cummulative tolerances, however, often result in the introduction of misalignments during assembly. The latter produce vibration during the dynamic phases of clutch operation. Thus, greater control over cummulative misalignments introduced during clutch assembly is needed in order to provide for more satisfactory clutch assembly practices.

SUMMARY OF THE INVENTION

This invention provides an improved pressure plate strap drive apparatus and a method for assuring against clutch misalignments otherwise introduced during assembly of clutches. The strap drive and method herein disclosed provide for means by which misalignments occuring due to cummulative tolerances and/or clearances in mating clutch parts can be avoided, particularly as related to pressure plate and strap drive parts.

In a preferred embodiment, the apparatus comprises a strap drive which is defined by a flexible flat steel member utilized to hold a pressure plate non-rotatably, but axially movable, with respect to a clutch cover assembly. The strap drive is conventionally attached to the pressure plate, but includes a novel system of primary and secondary connections to the cover assembly. The latter assembly includes a cover and an adaptor ring, the adaptor ring disposed for being positioned interjacent the flywheel and the cover. The primary connection of the strap drive to the cover assembly is defined by a joint connection to both the cover and the adaptor ring. The secondary connection of the drive strap to the cover assembly is defined by a separate single connection to the adaptor ring.

A preferred method involving the use of the drive strap apparatus includes the step of forming a subassembly which includes the pressure plate, the flexible drive strap, and the adaptor ring, the pressure plate being disposed concentrically with respect to the adaptor ring. The subassembly is utilized to assure concentricity of the pressure plate relative to the adaptor ring upon final assembly of the clutch.

DETAILED DESCRIPTION OF A PREFERRED EMBODIMENT

Figure 1:
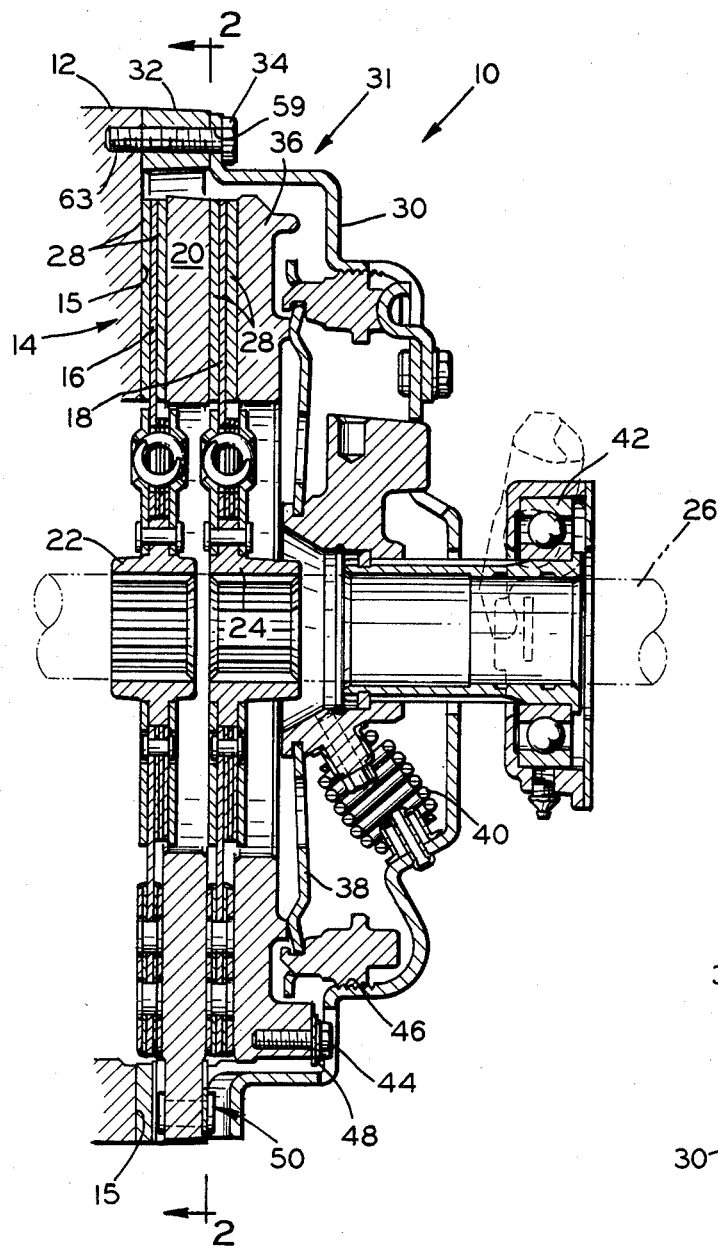
FIG. 1 is a side elevational view of a clutch which includes the strap drive apparatus of this invention.

Referring first to FIG. 1, a friction plate clutch 10 is shown mounted to a flywheel shown partially at 12. The clutch 10 includes a friction clutch assembly 14 defined by forward and rearward annular clutch discs 16 and 18, respectively. The discs 16 and 18 are secured to a pair of hubs, forward hub 22 and rearward hub 24, respectively. The hubs are in turn slidably splined on an output shaft 26, shown in phantom. Typically, the rearward end of the output shaft 26 is connected to the gears of a transmission (not shown) while the forward end is piloted in a bearing (not shown) retained in the flywheel 12 and coaxial therewith. The flywheel 12 is secured to and rotates with an engine crankshaft (not shown). The rearwardly facing planar surface 15 of the flywheel 12 is adapted to be engaged by the forwardly facing friction lining 28 of the forward disc 16.

It will be seen that the forward disc 16 is sandwiched between the latter planar surface 15 of the flywheel 12 and an intermediate pressure plate 20, as utilized in the preferred embodiment herein described. While this invention may be suitable for use in a clutch having a single pressure plate, the preferred embodiment of the present invention is shown employed in a dual plate clutch, or one including the intermediate pressure plate 20 and a separate rear pressure plate 36. Thus it will be apparent that the rearward annular clutch disc 18 will be frictionally engaged by the latter plates 20 and 36 at the respective forward and rearward friction linings 28 of the disc 18.

A clutch cover 30 is affixed to the flywheel 12 through an adaptor or spacer ring 32. (The adaptor ring 32 provides a convenient manner in which to transform a single plate clutch into a dual plate clutch, as described in U.S. Pat. No. 4,057,131 to Flotow.) The clutch cover 30 and adaptor ring 32 are secured by suitable means such as bolts 34. The ring and the cover can be installed on the flywheel separately, or they can be assembled and installed as a unit, the former being preferred in the method of the present invention, and as more fully described herein.

Thus, it may now be appreciated that the flywheel 12, the spacer ring 32, the cover 30, and the pressure plates 20 and 36 all rotate together as a unit, while the forward and rearward clutch discs 16 and 18 and the shaft 26 all rotate together as an interacting but separate unit. A plurality of clutch levers 38 are circumferentially spaced about the clutch 10 to provide engagement and disengagement of the plates and discs. A plurality of return springs 40 cooperate with a throw-out bearing 42 in a conventional manner to provide conventional engaging and disengaging movements of the levers, as will be appreciated by those skilled in the art.

Figure 3:
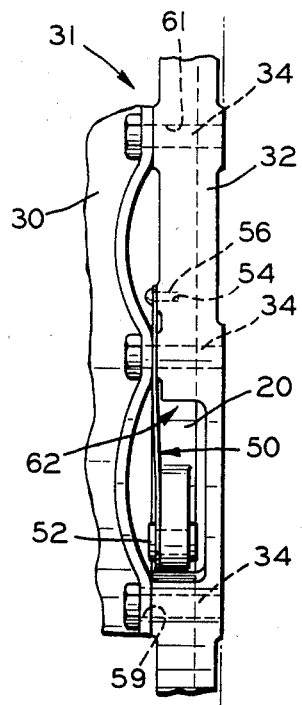
FIG. 3 is a fragmentary side elevation showing interconnections between the adaptor ring, pressure plate, and clutch cover in a preferred form of this invention.
Figure 2:
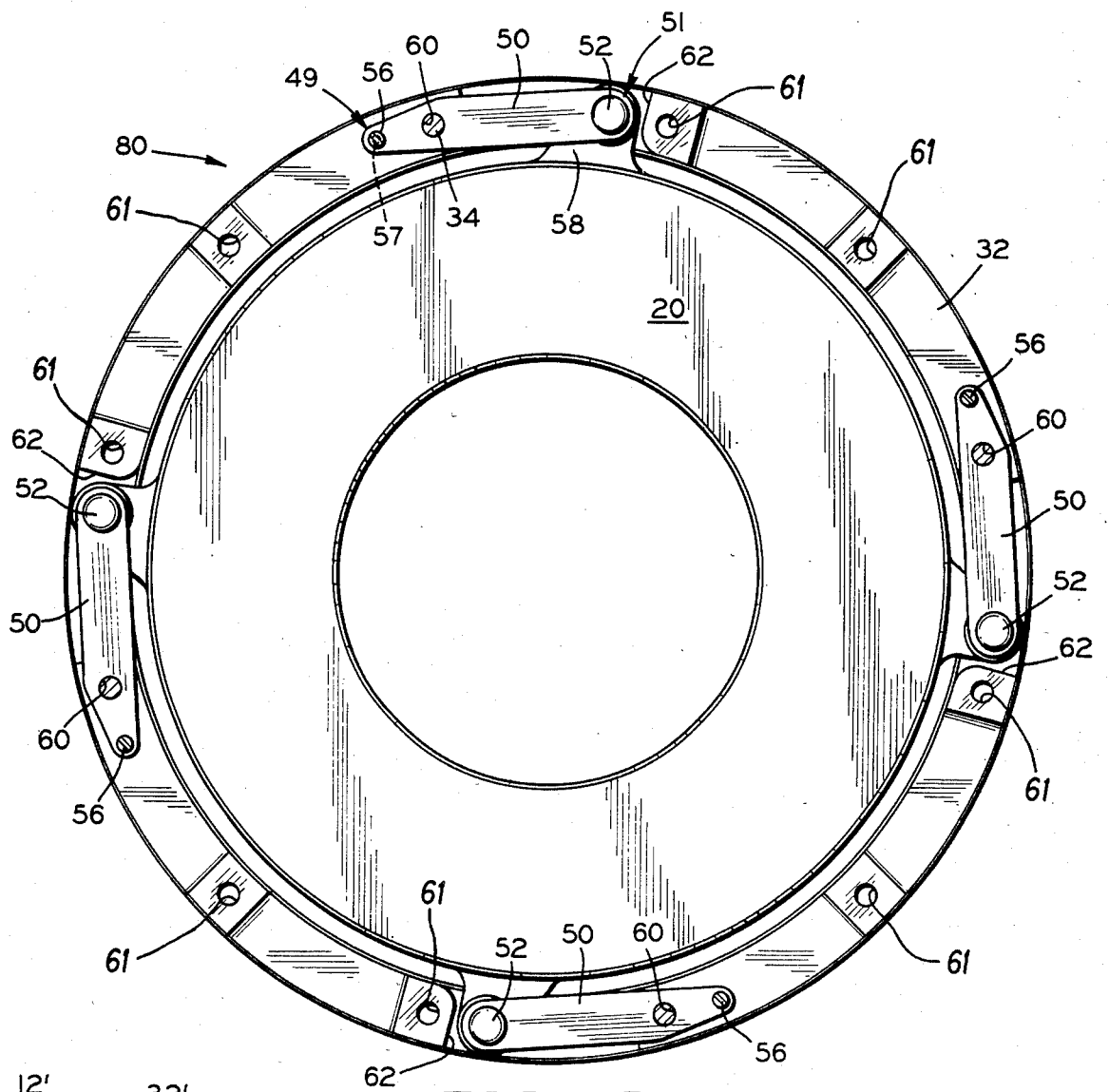
FIG. 2 is a sectional face view along lines 2—2 of FIG. 1 of an adaptor ring and a pressure plate held concentrically with respect thereto by the strap drive apparatus of this invention.

Referring now to FIGS. 2 and 3, the preferred form of the present invention utilizes a strap drive apparatus 50 to provide the connection means between the pressure plate 20 and the clutch cover assembly 31 (defined herein as adaptor ring 32 and clutch cover 30). The strap drive 50 provides a connection between the cover assembly 31 and the intermediate pressure plate 20, while a conventional strap drive 48 (FIG. 1) is attached to rear pressure plate 36 by bolts 44 to provide requisite connection between the cover assembly 31 and the rear pressure plate 36. The preferred embodiment of the clutch assembly 31 also contains an adjusting ring 46 which provides a capability for taking up slack due to wear of the friction linings 28.

Referring back to FIG. 2, it will be seen that a plurality of the improved strap drives 50 provides the only connections between the intermediate pressure plate 20 and the adaptor ring 32, the connection of each drive strap 50 being provided by a rivet 52 to the intermediate plate 20. Pluralities of bolts 34 and drive screws 56 provide primary and secondary connections, respectively, of the strap drive 50 to the cover assembly 31. Each strap drive 50 is defined by an elongate flat flexible steel body, having opposing ends 49 and 51. One end 49 contains an aperture 57 adapted for receiving a drive screw 56 to provide the secondary connection, while the opposite end 51 receives one of the rivets 52 for providing the connection of the intermediate pressure plate 20 to the strap drive 50. Interjacent the latter ends of the strap drive is an aperture 60 for receiving a bolt 34 and to thereby provide the primary connection. FIG. 3 shows the strap drive apparatus from a different perspective, wherein it will be apparent that a plurality of circumferentially extending pockets or openings 62 are positioned in the adaptor ring 32 for receiving integral, radially extending ears 58 of the intermediate pressure plate 20.

Referring generally to FIG. 1-3, it will be apparent that the above-defined primary connection is afforded by a plurality of circumferentially spaced bolts 34 which extend through mated sets of bolt apertures 59 through the cover 30, apertures 60 through the strap drive 50, apertures 61 through the adaptor ring 32, and apertures 63 through the flywheel 12. The primary connection means is conventional among clutches of this art. However, the secondary connection means as afforded by drive screws 56 (FIG. 3) provides a novel, inherently rigid connection system for the intermediate plate 20 relative to the adaptor ring 32, which includes a threaded bore 54 for receiving the drive screw 56 through the aperture 57 (FIG. 5) in the end 49 of the strap drive 50.

Figure 4:
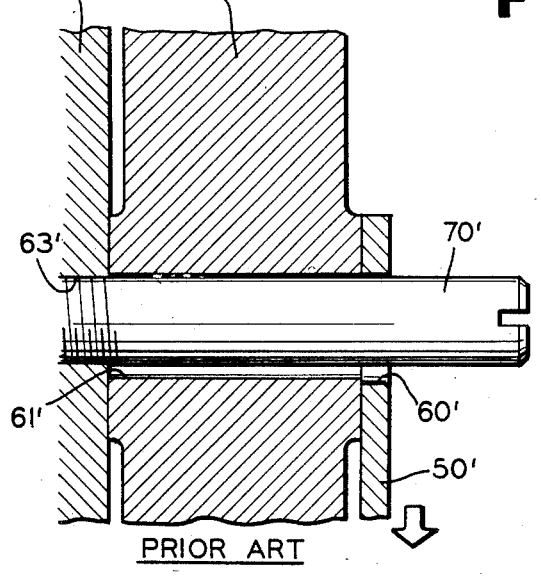
FIG. 4 is a fragmentary elevational view of a prior art strap drive.
Figure 5:
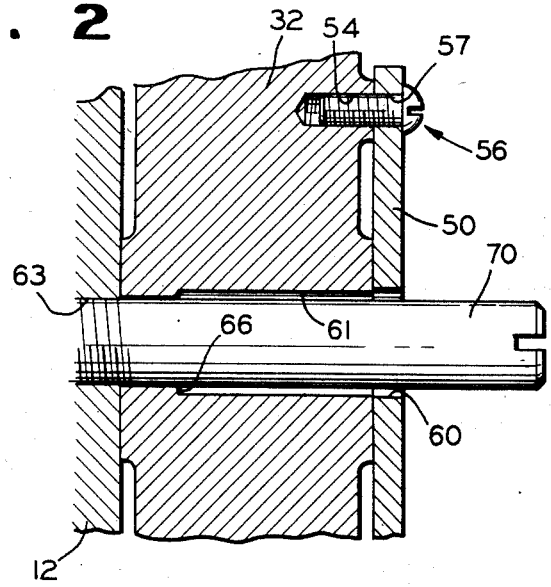
FIG. 5 is a view of a strap drive which incorporates the present invention.

Referring momentarily to FIG. 4, a prior art strap drive 50' is shown, wherein a conventional guide stud 70' is utilized during assembly of a clutch as shown. The strap drive 50' does not include a drive screw 56 (FIG. 5). During normal assembly procedures, the flywheel is in a vertical orientation, and the parts are mated in like orientation, their weights playing a major role in the aforenoted introductions of misalignment. For example, the weight of the intermediate plate (not shown) will cause the strap drive 50' to sag or droop downwardly, as shown by the arrow, whereby the bolt aperture 60' will be assymmetrically positioned during securement of the cover assembly to the flywheel.

By contrast, use of the drive screw 56 as shown in FIG. 5 will alleviate this problem, whereby the alignment will thus remain unaffected by the weight of the intermediate plate. It will also be appreciated by those skilled in the art that a self-locking mechanical screw device, as drive screw 56, will serve to minimize the effect of an accumulation of tolerances, which normally adversely affects alignment. Thus, the improved strap drive 50 will hold the intermediate plate 20 concentrically with respect to the spacer ring 32, regardless of the orientation of the flywheel during assembly. Moreover, the resulting concentricity will assure that during the dynamic operation of the clutch, the avoided misalignments will translate into reduced vibration during clutch operation.

A comparison of bores 61' and 61 in FIGS. 4 and 5, respectively, will show the preferred form of the bore 61 to include a step 66, which assists in maintaining concentricity. The adaptor ring 32 of the preferred embodiment is constructed of a die cast aluminum wherein closer tolerances may be more easily achieved, than were available in the cast iron adaptor rings of the prior art.

A preferred method of clutch assembly utilizing the strap drive apparatus 50 is described as follows. By way of example only, as design expedients can vary widely, four drive screws 56 are employed circumferentially about the spacer ring 32, and a total of twelve sets of the apertures 59, 61 and 63 are utilized in the preferred procedure, the apertures being appropriately spaced relative to the circumferentially extending pockets 62 and the intermediate plate ears 58. It should be noted that the pressure plate strap drive 50 is a flexible flat member, preferably made of a resilient flat spring steel stock. The object of the flexibility is to allow for limited axial movement of the pressure plate, while of course restricting same from rotation relative to the cover assembly 31.

In order to insure a fixed alignment of the clutch pressure plate with respect to the clutch cover assembly, the following steps are preferred:

1. A subassembly 80 is first formed, as shown in FIG. 2. The subassembly 80 is made up of the pressure plate 20, the flexible drive straps 50, and the adaptor ring 32. The pressure plate is positioned concentrically with respect to the adaptor ring, the rivets 52 being utilized for securing the ears 58 of the pressure plate 20 to the straps 50. The drive straps are connected during this first step only by the secondary connections or drive screws 56 to the adaptor ring 32.

2. Next the subassembly is mounted over a pair of guide pins 70 (FIG. 5), which are inserted into two (preferably 180 degrees apart) of the sets of bores 63 in the flywheel, the guide pins 70 preferably having threaded ends for mating with preferably threaded bores 63 of the flywheel. The formed subassembly is thus first positioned temporarily to the clutch flywheel on the guide studs 70, the studs extending through two sets of the apertures 60 and 61 of the subassembly.

3. Next, the clutch cover 30 is assembled over the guide studs 70, the studs extending through two of the apertures 59 (FIG. 1).

4. Finally, the clutch cover connection members or bolts 34 are inserted through all exposed sets of mated apertures 59, 60, 61 of the cover, strap, and adaptor ring, respectively, and secured into the bores 63 of the flywheel, whereby the cover and subassembly are rigidly affixed to the flywheel for rotation therewith.

To the extent that only ten bores 63 are exposed in the flywheel for receiving the bolts 34 during the above-described procedure, the two assembly guide pins 70 are ultimately removed, and two bolts 34 are rigidly secured to the flywheel in their stead. Although in the preferred embodiment the connection members are bolts and are matable with internally threaded bores of the flywheel, other suitable connection means can be utilized within the scope of the present invention.

Finally, referring to FIG. 3, it may be appreciated that in the finished product, the primary connection as afforded by bolt 34 through the strap drive 50 and the cover assembly 31 will be to both the spacer ring 32 and the clutch cover 30, whereas the secondary connection of the strap drive 50 will be solely to the adaptor ring 32 by means of the mechanical drive screws 56.

Thus this invention provides a novel strap drive apparatus and method for solving a long-standing problem related to the introduction of misalignments into clutches during assembly.

What is claimed is:

1. In a friction plate clutch comprising a cover assembly disposed for mounting to a rotatable flywheel, a pressure plate contained within and axially movable relative to said cover assembly, and a flexible pressure plate strap drive connected to said pressure plate; an improvement wherein said pressure plate strap drive comprises primary and secondary connection means to said cover assembly, both of said connection means comprising direct and positive contacts between said strap drive and said cover assembly, said secondary connection means providing the sole means for insuring concentricity of said pressure plate with respect to said cover assembly, said cover assembly comprising a clutch cover, and an axially extending adapter ring secured thereto, said primary connection means comprising a joint connection of said strap drive to both said adapter ring and cover, and said secondary connection means comprising a separate connection solely to said adapter ring.

2. The clutch of claim 1 wherein said secondary connection means of said drive strap to said adaptor ring comprises a self-locking mechanical screw.

3. The clutch of claim 2 wherein said adaptor ring includes a circumferentially extending opening, said pressure plate includes an ear extending radially into said opening, and wherein said strap drive is disposed circumferentially relative to said adaptor ring and retains said ear within said opening.

4. The clutch of claim 3 wherein said connection of said strap drive to said ear of said pressure plate is at one end of said strap drive, said secondary connection of said strap drive to said spacer ring is at an opposite end of said strap drive, and wherein said primary connection of said strap drive is interjacent said pressure plate and said secondary connections of said strap drive.

5. A friction plate clutch comprising a cover assembly disposed for mounting to a rotatable flywheel, a pressure plate contained within and axially movable relative to said cover assembly, a flexible pressure plate strap drive connected to said pressure plate, and said pressure plate strap drive comprising primary and secondary connection means to said cover assembly, both of said connection means comprising direct and positive contacts between said strap drive and said cover assembly, said connection means providing the sole means for insuring concentricity of said pressure plate with respect to said cover assembly, said cover assembly comprising a clutch cover, and an axially extending adapter ring secured thereto, said primary connection means comprising a joint connection of said strap drive to both said adapter ring and cover, and said secondary connection means comprising a separate connection solely to said adapter ring.

6. A method of assembling a clutch to insure fixed alignment of a clutch pressure plate with respect to a clutch cover comprising the steps of:

(a) forming a subassembly including said pressure plate, at least two flexible drive straps affixed thereto, and an adapter ring disposed concentrically with respect to and radially outwardly of said pressure plate, said drive straps comprising primary and secondary connection apertures, and affixed to said adapter ring by said secondary connection apertures, (b) mounting said subassembly to a clutch flywheel, said flywheel containing a plurality of bores, by inserting at least a pair of guide studs into two of said bores, and installing said adapter ring over said guide studs through two of said primary connecting apertures of said drive straps, said adapter ring including apertures disposed for mating with said bores of said flywheel, (c) mounting said clutch cover to said subassembly, said clutch cover including apertures matable with said adapter ring apertures, over said guide studs, and (d) inserting connection members through said apertures of said adapter ring and said cover, and securing said members in said bores of said flywheel, whereby said cover and said subassembly are rigidly affixed to said flywheel for rotation therewith.

* * * * *